Oct. 11, 1938. J. S. NORTON 2,132,430
FISHING REEL
Filed June 26, 1936 2 Sheets-Sheet 1

INVENTOR
JOHN S. NORTON
BY A. Schapp
ATTORNEY

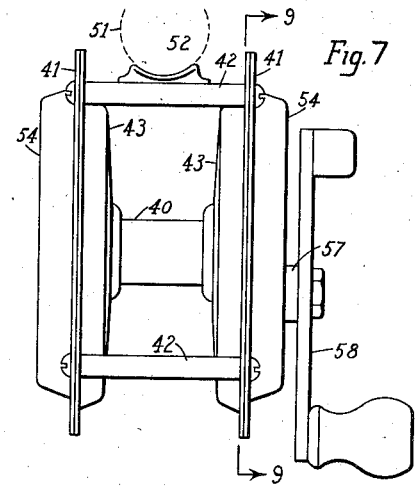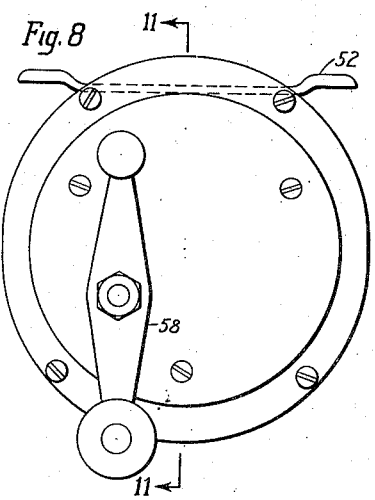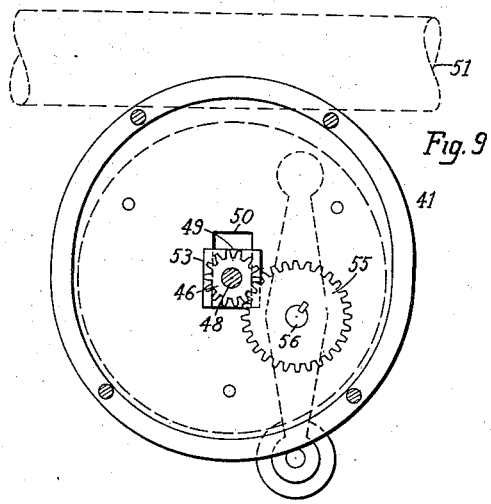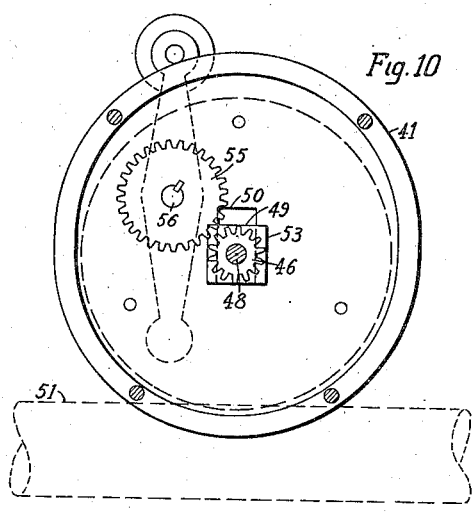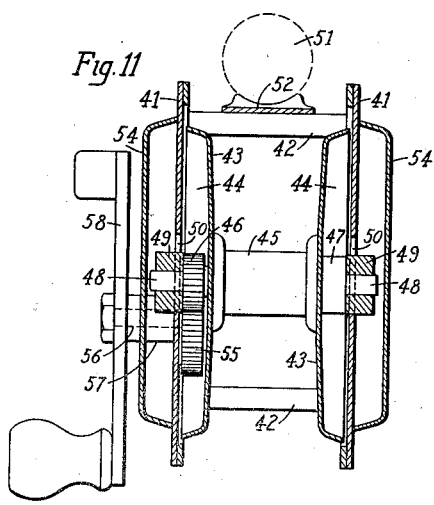

Patented Oct. 11, 1938

2,132,430

UNITED STATES PATENT OFFICE 2,132,430

FISHING REEL

John S. Norton, San Francisco, Calif.

Application June 26, 1936, Serial No. 87,378

6 Claims. (Cl. 242—84.7)

The present invention relates to improvements in fishing reels and its principal object is to provide means in connection with a fishing reel whereby its manipulation may be facilitated and the general usefulness of the same enhanced.

In a fishing reel of the conventional type it is desirable that full freedom of rotation be given to the spool carrying the fishing line during the casting operation while on the other hand it is also desirable that means be provided permitting the operator to quickly gain control over the spool for retrieving.

In my invention it is proposed to provide a simple means for effecting a quick change from a freely revolvable spool to a controlled spool and more particularly it is proposed to effect this change by a mere turning movement of the reel or of the fishing rod to which it is secured.

It is further proposed to use the force of gravity to effect the change and to provide a transmission between a manipulating handle and the spool in which one member may move freely between active and inactive positions in response to turning movements of the reel by simply following the laws of gravity.

It is further proposed, in one form of my invention, to provide a transmission containing a planetary gear having limited concentric motion around a driving gear with which it meshes and thus adapted to assume driving or inactive positions relative to a pinion mounted on the spindle shaft.

It is further proposed, in a second and simplified form of my invention, to mount the spool itself on movable bearings whereby a gear wheel secured thereto may be made to automatically fall into and out of engagement with a driving pinion when the rod is turned from one position to the other.

A further object of the invention is to provide adjustable means for introducing a desired amount of slip between the manipulating means and the spool whereby the latter is allowed to yield to excessive draft on the line regardless of the manipulating means.

Further objects and advantages of my invention will appear as the specification proceeds.

Figure 1:
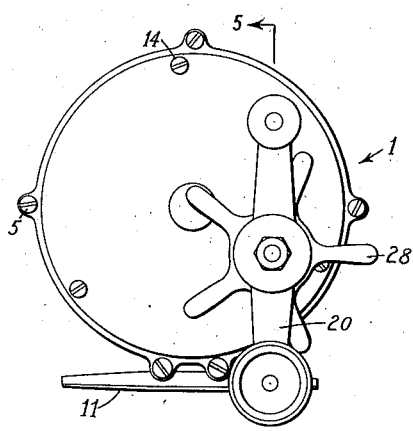
Figure 2:
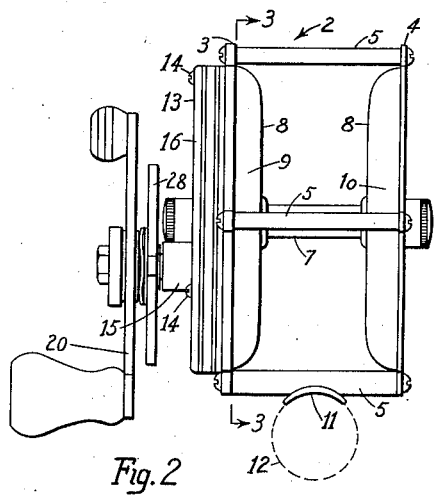
Figure 3:
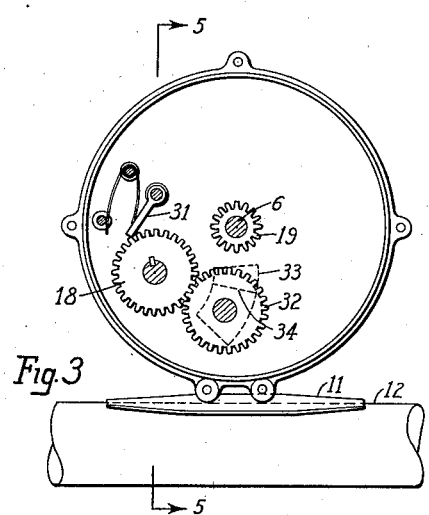
Figure 4:
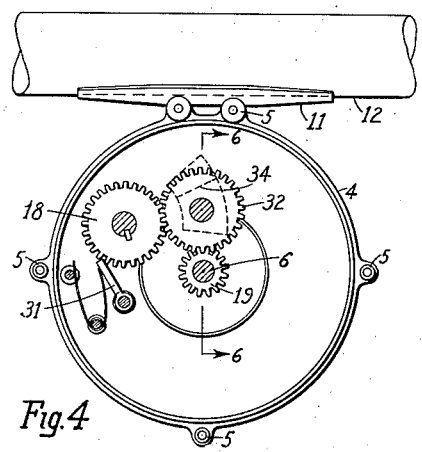
Figure 5:
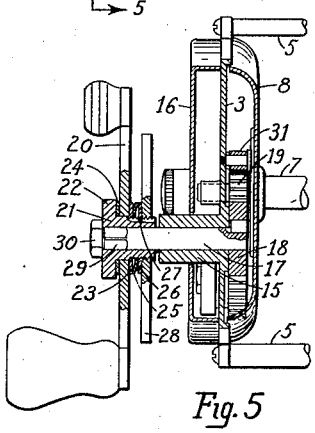
Figure 6:
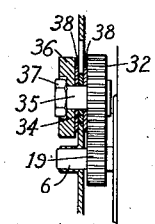

The preferred forms of my invention are illustrated in the accompanying drawings in which Figure 1 shows a side view of one form of my fishing reel, Figure 2 a front view of the same reel as mounted upon a fishing rod, Figure 3 a section taken along line 3—3 of Figure 2, Figure 4 a similar section with the reel turned upside down, Figure 5 a section through the manipulating means taken along line 5—5 of Figure 1, Figure 6 a section taken along line 6—6 of Figure 4, Figure 7 a front view of a second and simplified form of my fishing reel, Figure 8 a side view thereof, Figure 9 a section taken along 9—9 of Figure 7, showing the gears in engagement, Figure 10 a similar section, with the reel turned upside down and the gears out of engagement, and Figure 11 a vertical section through the reel taken along line 11—11 of Figure 8.

While I have shown only the preferred forms of my invention I wish to have it understood that various changes or modifications may be made within the scope of the claims hereto attached without departing from the spirit of the invention.

Describing first the form shown in Figures 1 to 6, my fishing reel 1 may be in its general features of a conventional type and comprises a frame 2 consisting of two discs 3 and 4 held in spaced and parallel relation by a plurality of spacing rods 5 and supporting the shaft 6 of the spool 7 which latter has two dished end flanges 8 which are free to rotate against the inner faces of the discs and form chambers 9 and 10 respectively therewith. Two of the spacing rods 5 are mounted in close proximity to one another and have the seat 11 secured thereto by means of which the reel may be fastened to a fishing rod 12 in a conventional manner.

The disc 3 has a cylindrical housing 13 secured upon the outer face thereof by means of screws 14 and has a sleeve 15 projecting through the outer wall 16 of the housing in eccentric relation to the spindle and this sleeve serves as a bearing for the shaft 17 which has a gear wheel 18 mounted upon the inner end thereof, the said gear wheel being thus arranged on the inside of the disc 3 and in the chamber 8. The latter chamber also accommodates a pinion 19 on the shaft 6 of the spool or spindle so that the pinion and the gear wheel are in the same plane but spaced from one another as plainly shown in Figures 3 and 4.

The outer end of the shaft 17 has the handle 20 secured thereto in such a manner that the connection between the handle and the shaft may be loosened and tightened at will for regulating the amount of energy that may be transferred from the handle to the spool. For this purpose the handle is first mounted, with freedom of revolving movement, upon a sleeve 21 having an outer flange 22, with friction washers 23 and 24 on opposite sides of the handle, a spring washer 25 following the washer 23 and a metal washer 26 following the spring washer, the metal washer being held against rotation by a tongue and groove arrangement indicated at 27.

A wheel 28 is threaded upon the inner end of the sleeve 21 and if screwed tightly will establish a firm bond between the handle and the sleeve. But when the wheel is partly unscrewed, the hold of the handle upon the sleeve becomes less firm and a certain amount of slippage is allowed, depending upon the position of the wheel.

The sleeve is telescoped over the outer end of the shaft 17 and is held against rotation by the squared section 29 of the shaft and against endwise movement by the nut 30 threaded upon the end of the shaft. It will thus be noted that the degree to which energy is transmitted from the handle to the gear wheel 18 depends upon the adjustment of the wheel 28. The gear wheel 18 is free to rotate in one direction only and is held against reverse rotation by the spring-actuated pawl 31.

For transmitting motion from the gear wheel 18 to the pinion 19 I use a planetary gear 32 which is mounted with freedom of planetary motion about the gear 18, while being in mesh therewith and is adapted to move into and out of engagement with the pinion 19, depending upon the position of the reel relative to the fishing rod. When the reel is above the fishing rod, as in Figure 3, the gear 32 is out of engagement with the pinion 19, and this is the casting position, since the reel is absolutely free to unwind the fish line. When the reel is below the fishing rod, as in the Figure 4, the gear 32 is in engagement with the pinion 19 and this is the retrieving position since now the line may be wound upon the spool by manipulation of the handle. The change in position is effected by a mere turning movement of the rod for bringing the reel above or below the rod.

The structural arrangement for this idea consists in an arcuate slot 33 in the disc 3 concentric with the gear wheel 18 and having a thin block 34 of the same shape slidable therein, the block serving as a bearing for the shaft 35 on which the gear 32 is supported. For balancing the weight of the gear I secure a counterweight 36 upon the opposite end of the shaft 35 by means of a nut 37, the counterweight being within the housing 13. Suitable washers 38 may be interposed between the disc and the gear on the one side and the counterweight on the other side. The slot is arranged between the pinion and the attachment for the rod so that the bearing 34 will readily drop by gravity from one end to the other on a turning movement of the rod.

The operation of this form of my invention will be readily understood from the foregoing description. For casting the reel is held above the rod, with the handle on the left side, as in Figure 2. The spool is now free to rotate and the fisherman may freely cast his line as far as he can throw it. For retrieving the rod is turned so as to bring the reel below the rod with the handle on the right hand side. The movement will cause the planetary gear 32 to drop into engagement with the pinion 19 and rotary movement may be imparted to the spool by manipulation of the handle. Any desired degree of slip may be obtained by adjustment of the wheel 28.

In the second and simplified form of my invention illustrated in Figures 7 to 11 the intermediate gear is omitted and the spool itself is made to move in response to turning movement of the rod and reel. As shown in the drawings, the spool 40 is mounted between the two discs 41, which latter are held in spaced and parallel relation by the spacing rods 42.

The spool, as previously described, has two dished end flanges 43 which are free to rotate and slide relative to the inner faces of the discs and form chambers 44 therewith. The spindle 45 of the spool carries a pinion 46 in one of the chambers 44 and a balancing wheel 47 in the other chamber 44 and terminates in reduced journals 48 which are revolvably mounted in blocks 49. The latter are slidable in slots 50 in the discs 41, the slots being rectangular in shape and being disposed to allow the bearing blocks 49 to move toward and away from the rod on which the reel is mounted.

The rod is indicated at 51 and the seat for the rod at 52. The bearing blocks are made to have an easy sliding fit in the slots and are provided with flanges 53 lying against the inner faces of the discs so that the blocks may be readily inserted from the spool side during the assembling operation. Cover plates 54 are secured to the outside of the discs in any suitable manner, as by screws or welding.

A driving gear 55 is mounted in one of the chambers 44 on the end of a shaft 56 journaled in a bearing sleeve 57 supported in the disc 41 and its cover plate 54, and the shaft has a conventional handle 58 mounted thereon. The driving gear is mounted on the disc off-center and the pinion 46 meshes with the driving gear when in one end position while it clears the driving gear when moved to the other end position.

The operation of this second form of my invention is as follows: When the reel is disposed below the rod 51, as in Figure 9, the bearing blocks 49 slide to the bottom of the slots 50 and the pinion 46 meshes with the gear wheel 55 so that rotation of the handle will cause the spool to rotate. When the reel is turned upside down so as to be above the rod the bearing blocks and the spool drop toward the opposite end of the slots and out of engagement with the gear 55. The spool is now free to revolve for casting the line.

It will be noted that the gear wheel in the position shown in Figure 9 is not directly below the slot and the pinion but is arranged toward the side so that the gear wheel has no tendency to lift the pinion. As a matter of fact when the handle is turned to the right for winding the spool there is a tendency of the gear wheel to urge the pinion toward the bottom of the slot rather than otherwise.

I claim:

1. In combination, a fishing rod, a reel mounted thereon including two spaced discs having registering slots therein, the slots being substantially perpendicular to the fishing rod, bearing blocks slidable in the slots, a spool rotatable in the blocks having a pinion thereon and a driving gear for the pinion being mounted laterally of the slot.

2. In combination, a fishing rod, a reel mounted thereon including two spaced discs having registering slots therein, the slots being substantially perpendicular to the fishing rod, bearing blocks slidable in the slots, a spool rotatable in the blocks having a pinion thereon and a driving gear for the pinion positioned to mesh therewith when the bearing blocks occupy a predetermined position in the slots.

3. In a fishing reel, a frame including two spaced discs having registering slots therein, bearing blocks freely slidable in the slots, a spool revolvable in the bearing blocks having a pinion secured thereto, the bearing blocks each having a flange on one side only riding on the inner faces of the discs, and a driving gear for the pinion positioned to mesh therewith when the bearing blocks occupy a predetermined position in the slots.

4. In combination, a fishing rod and a fishing reel comprising a frame mounted on the rod, a spool revolvable therein, a handle for operating the spool and a transmission interposed between the handle and the spool, the transmission comprising a gear wheel secured to the spool, a gear wheel fixed to the handle and an intermediate gear wheel meshing with one of the gear wheels and mounted with freedom of movement about the axis of the latter by gravity in a direction toward and away from the fishing rod so as to automatically drop into engagement with the other gear wheel wherein the reel is held in a predetermined position and out of engagement therewith when the reel is inverted relative to said position in response to turning movements of the fishing rod.

5. In a fishing reel, a frame, a spool revolvable therein, a manipulating means for the spool including a pair of coacting gears, and gravity actuated mounting means for one of the gears movably supported in the frame and arranged to mesh the gears when the frame is held in a predetermined position, the mounting means being automatically movable by gravity to disengage the gears when the frame is inverted relative to said position.

6. In combination, a fishing rod, a fishing reel mounted thereon, a spool revolvable in the reel, manipulating means for the spool including a pair of coacting gears, and gravity-actuated mounting means for one of the gears movably supported in the frame and arranged to mesh the gears when the reel is positioned on one side of the rod, the mounting means being automatically movable by gravity to disengage the gears when the rod is moved to position the reel on the opposite side of the rod.

JOHN S. NORTON.